UNITED STATES PATENT OFFICE.

EMANUEL KARDOS, OF NEWARK, NEW JERSEY, ASSIGNOR TO METAL & THERMIT CORPORATION, OF CHROME, NEW JERSEY, A CORPORATION OF NEW JERSEY.

METHOD OF PRODUCING PURE ZINC SOLUTION.

1,409,727.  Specification of Letters Patent.  Patented Mar. 14, 1922.

No Drawing.  Application filed December 20, 1919.  Serial No. 346,311.

*To all whom it may concern:*

Be it known that I, EMANUEL KARDOS, a citizen of Hungary, and resident of Newark, in the county of Essex, and State of New Jersey, have invented certain new and useful Methods of Producing Pure Zinc Solutions, of which the following is a specification.

The invention relates to a novel process for eliminating impurities, such as salts of other metals, particularly iron and metals which are electronegative to zinc, that is, which are below zinc in the electromotive series of the metals, from solutions of zinc salts, such as sulphate of zinc and chloride of zinc resulting from any of the well known processes which produce such salts, including the recovery of zinc from galvanized scrap or zinc coated iron.

It is a well known fact that it is difficult to precipitate all iron out of any zinc solution containing the same, especially when it is imperative to remove the last traces of the iron. This is evident from the relative prices of zinc salts containing different proportions of contaminating iron. For instance, commercial zinc sulphate containing about .03% iron sells for about four cents per pound in normal times, whereas the chemically pure zinc sulphate containing not more than .001% iron sells for forty cents per pound in the same market. The differences in the cost of the two products is represented by the expense of removing all but the mere trace of iron.

Many processes have been suggested and employed for the removal of iron from solutions of zinc salts, and it is the common practice to first oxidize the iron content and then precipitate the same by various reagents. All of these processes, however, are either incomplete, inasmuch as they fail to remove all of the iron, or on the other hand, are too expensive for economical industrial application.

The present invention is designed to obviate both the difficulties and expensiveness of the prior art methods and to successfully eliminate all of the objectionable iron or metals which are electronegative to zinc from zinc salts in a very simple and inexpensive manner.

In practice I proceed as follows, in case of the removal of iron from zinc salts:—

The crude zinc sulphate or zinc chloride solution, which may be the product of a degalvanizing process, or any of the other well known processes which yield one or the other of the salts mentioned, is heated and the iron oxidized by any known commercial process, for instance, by the addition of potassium or sodium chlorate, chlorine or other oxidizing medium, after which galvanized scrap or zinc coated iron is immersed in the solution, with the result that the acid liberated during the oxidizing reaction unites with the zinc from the scrap, in accordance with the following reaction:

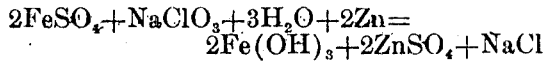

$$2FeSO_4 + NaClO_3 + 3H_2O + 2Zn = 2Fe(OH)_3 + 2ZnSO_4 + NaCl$$

The solution is kept boiling with the zinc scrap therein until the solution is rendered basic, when the entire iron content will have been precipitated. This condition may be readily ascertained by a simple and reliable test as follows: A sample of the solution is withdrawn and filtered, and a showing of cloudiness produced by the zinc compounds, if the reaction has been completed, will indicate that the iron has been completely eliminated. The galvanized scrap is then removed from the solution and may be used again for further reactions on other solutions until the zinc coating thereon has been exhausted. The solution is then carefully filtered, and will, as indicated, be found entirely free from iron. In case any cloudiness remains in the solution, sulphuric acid or hydrochloric acid is added in appropriate amounts until the solution is rendered perfectly clear.

The advantages of this simple and inexpensive process over other known methods are manifold, and some of them may be recited as follows: First, all of the acid combined with the iron in the solution is profitably used to produce proportionate quantities of zinc salts, viz: zinc sulphate or zinc chloride, depending upon whether the iron was in the sulphate or chloride form. In other processes it was found necessary to neutralize this acid with lime or the like, and remove the resultant product as calcium sulphate or calcium chloride, which are of little value and are ordinarily regarded as waste products. Second, the galvanized scrap after being stripped of its zinc coating may be used effectively in the steel industry and has a higher value as black scrap than has galvanized scrap. Third, the precipitated iron oxide, not being contaminated with lime or the like, is in itself a valuable by-product. Fourth, both the apparatus and the procedure necessary to carry out the process are quite simple and inexpensive in the matter of time, labor and materials, and there are no waste products.
It is a well known fact that metallic zinc when added alone to a solution of zinc salts containing iron or the like, under the same conditions as hereinbefore described, will not precipitate the iron or other contaminating metal, but it is a highly significant fact that zinc when associated with a suitable metal, such as iron, as for example, galvanized iron scrap, is most effective. The reason for this appears to be that the reaction which takes place is not a mere chemical one but is apparently an electrochemical reaction, the iron of the galvanized scrap acting in conjunction with the zinc as a galvanic couple.

What I claim is:

1. The method of purifying zinc salt solutions which comprises precipitating metals which are electronegative to zinc therefrom by reacting upon the solution with zinc in association with a metal electronegative thereto.

2. The method of purifying zinc salt solutions which comprises precipitating metals which are electronegative to zinc therefrom by reacting upon the solution with galvanized iron.

3. The method of purifying zinc salt solutions which comprises precipitating metals which are electronegative to zinc therefrom by boiling the solution and reacting upon the same with zinc associated with a metal electronegative thereto.

4. The method of purifying zinc salt solutions which comprises precipitating metals which are electronegative to zinc therefrom by boiling the solution and reacting upon the same with galvanized iron.

5. The method of eliminating salts of metals of the iron group from solutions of zinc salts which comprises adding an oxidizing agent to the solution, and reacting upon the solution with metallic zinc associated with a metal electronegative thereto.

6. The method of eliminating salts of metals of the iron group from solutions of zinc salts which comprises adding an oxidizing agent to the solution, and reacting upon the solution with galvanized iron.

7. The method of eliminating salts of metals of the iron group from solutions of zinc salts which comprises boiling the solution, adding an oxidizing agent thereto, and reacting upon the solution with galvanized iron.

8. The method of eliminating iron from solutions of zinc salts which comprises treating the solution with metallic zinc in conjunction with a metal electronegative thereto.

9. The method of eliminating iron from solutions of zinc salts which comprises treating the solution with galvanized iron.

10. The method of eliminating iron from solutions of zinc salts which comprises boiling the solution with galvanized iron.

11. The method of eliminating iron from solutions of zinc salts which comprises adding an oxidizing agent, and boiling the solution with galvanized iron.

Signed at Chrome, N. J., in the county of Middlesex and State of New Jersey, this 18th day of December, A. D. 1919.

EMANUEL KARDOS.